United States Patent [19]
Chou

[11] Patent Number: 5,850,526
[45] Date of Patent: Dec. 15, 1998

[54] LAN STATION FOR DETERMINING THE DESTINATION LAN STATION IS CAPABLE OF DECOMPRESSING BY COMPARING DESTINATION ADDRESS TO BLOCK OF ADDRESSES ASSIGNED BY A LAN MANUFACTURER

[75] Inventor: Benjamin E. Chou, Irvine, Calif.

[73] Assignee: Kingston Technology Co., Fountain Valley, Calif.

[21] Appl. No.: 598,156

[22] Filed: Feb. 7, 1996

[51] Int. Cl.$^6$ ................................... G06F 13/00
[52] U.S. Cl. ........................ 395/200.77; 395/200.58
[58] Field of Search ................... 370/401, 392; 380/49.9; 364/242.01; 395/200.02

[56] References Cited

U.S. PATENT DOCUMENTS

| | | | |
|---|---|---|---|
| 4,894,847 | 1/1990 | Tjahjadi et al. | 375/377 |
| 5,131,016 | 7/1992 | Broughton et al. | 375/240 |
| 5,179,555 | 1/1993 | Videlock et al. | 370/402 |
| 5,179,651 | 1/1993 | Taaffe et al. | 345/202 |
| 5,293,379 | 3/1994 | Carr | 370/94.1 |
| 5,307,413 | 4/1994 | Denzer | 380/49 |
| 5,386,412 | 1/1995 | Park et al. | 370/270 |
| 5,396,180 | 3/1995 | Hampton et al. | 324/551 |
| 5,396,493 | 3/1995 | Sugiyama | 370/403 |
| 5,442,630 | 8/1995 | Garliardi et al. | 370/402 |
| 5,446,740 | 8/1995 | Yien et al. | 395/200.77 |
| 5,579,316 | 11/1996 | Venters et al. | 370/94.1 |
| 5,633,869 | 5/1997 | Burnett et al. | 370/396 |

*Primary Examiner*—Thomas C. Lee
*Assistant Examiner*—Anderson I. Chen
*Attorney, Agent, or Firm*—Stuart T. Auvinen

[57] ABSTRACT

Data is compressed in an industry-standard local-area network (LAN) such as IEEE 802.2 or 802.3. Compression occurs at a low level, in the data link layer just above the physical layer. The data in the packet is compressed, but the source and destination addresses are not compressed. A type/length field which indicates the length of the data field is adjusted for the new compressed length, while a frame checksum which was calculated for the uncompressed data is re-generated for the compressed data. Thus the packet with the compressed data has the length and checksum adjusted for the newly compressed data so that the packet appears normal to other layers of the LAN protocol. A status byte may be added to the compressed data to disable compression on a remote LAN station. The compressed data packet is compatible with hubs to other LANs and bridges to WANs. The low-level compression is compatible with LANs that have older LAN stations that do not have compression capabilities, since the only packets compressed are those sent to LAN stations that support low-level compression. A destination address table is consulted which includes the compression capabilities of other LAN stations. Thus multi-point LANs can support data compression.

19 Claims, 11 Drawing Sheets

TRANSMITTED PACKET:

RECEIVED PACKET:

ORIGINAL PACKET:

COMPRESSED PACKET TRANSMITTED:

RECEIVED PACKET:

RECEIVED PACKET DE-COMPRESSED:

LAN STATION FOR DETERMINING THE DESTINATION LAN STATION IS CAPABLE OF DECOMPRESSING BY COMPARING DESTINATION ADDRESS TO BLOCK OF ADDRESSES ASSIGNED BY A LAN MANUFACTURER

BACKGROUND OF THE INVENTION—FIELD OF THE INVENTION

This invention relates to data compression, and more particularly for low-level compression in a local-area network.

BACKGROUND OF THE INVENTION— DESCRIPTION OF THE RELATED ART

Data compression has been widely used to reduce transfer delays for point-to-point communication. Personal computers (PC's) use a modem to connect to other computer systems over dial-up or leased telephone lines. To reduce telephone charges, data is often compressed before transmission and expanded or de-compressed after reception. The user may run a separate compression program, or sophisticated applications may automatically execute a compression/decompression program transparently to the user. Software for commercial on-line services such as America OnLine (AOL) of Vienna, Va. often perform decompression transparently to the user to reduce telephone connect time.

Some modems include a compression engine to perform data compression, using either a hardware or a software compressor. However, the receiving modem must have the same capabilities or compressed data cannot be read once received. More complex bridges, routers, and hubs for larger networks also employ compression in a point-to-point connection. Data is received from a local network in an uncompressed format. The data is then compressed by the bridge and transmitted to a receiving bridge, which then de-compressed the data and sends it out, uncompressed, over a remote network. The point-to-point connection between the bridges is known as a wide-area network (WAN). WAN's connect distant networks or computers using a point-to-point connection, with a single transmitter and a single receiver. Bi-directional or full-duplex communication occurs when the transmitter and receiver swap roles.

A local-area network (LAN) differs from a WAN not just in distances between stations but also in the connection arrangement. While a WAN has just one receiver and one transmitter, a LAN has many stations, any of which can transmit and receive. The LAN stations are connected together by a common bus, such as an Ethernet cable which is electrically connected to many LAN stations. Another common LAN arrangement is a ring, with the LAN stations arranged in a ring topology, with each station connected to two other LAN stations: an upstream and a downstream station. Data packets travel around the ring from the transmitting station to the receiving station.

FIG. 1 is a prior-art WAN network connecting two LAN networks. Local LAN 10 includes LAN stations 12 which are often personal computers with an Ethernet or token ring adapter card. Remote LAN 14 also has LAN stations 16 connected together by a LAN cable 28. LAN cable 28 is typically a twisted-pair of wires. Local LAN 10 and remote LAN 14 are connected together by WAN 26. WAN 26 may be a dedicated or leased data or telephone line, or a wireless link such as radio or microwave. Bridge 18 receives data packets from LAN 10, re-packetizes this data, and transmits the data over WAN 26 to bridge 20. Bridge 20 then un-packetizes the data and transmits it over LAN cable 28. A local LAN station 12 may transmit data to one of the remote LAN stations 16 by transmitting the data over local LAN 10 to bridge 18, then across WAN 26 to bridge 20, and then over remote LAN 14 to remote LAN stations 16. WAN 26 provides a point-to-point link between bridges 18, 20, which appear as stations on local LAN 10 and remote LAN 14, respectively.

Compression may be introduced into WAN 26 by compressing data at bridge 18 using compressor 22, and de-compressing the data at bridge 20 using decompressor 24. Since compressed data is only transmitted over WAN 26, and not LANs 10, 14, LAN stations 12, 16 do not have to be aware of the compression or provide any compression support. Thus providing compression in bridges 18, 20 is transparent to the user. However, uncompressed data is still transmitted across LANs 10, 14, wasting LAN bandwidth.

Another way to introduce compression is to compress the data at LAN station 12 before transmission to LAN 10. However, the receiving LAN station 16 must be able to decompress the data. Often the data file is simply compressed using a stand-along compression program such as the UNIX 'compress' command or PKZIP, written by PKWare Inc. of Brown Deer, Wis. While high-level file compression certainly reduces both LAN and WAN bandwidth, high-level compression is not transparent to the user, who is required to type in the command to compress the file before it is transferred. Application software may perform file compression transparently before transmission, but not all software can do compression, and often the software does not know if a file is to be transferred or simply remain on the local station's disk. Thus high-level compression is either not transparent to the user, or is not performed on all data transmitted, including data from older existing software.

U.S. Pat. Nos. 5,179,555 by Videlock et al., assigned to Microcom Systems, 5,293,379 by Carr, assigned to Gandalf Technologies, and 5,307,413 by Denzer, assigned to Process Software Corp. are examples of point-to-point WANs using data compression at the bridges to the WAN. U.S. Pat. No. 5,446,740 by Yien et al., assigned to Empire Blue Cross is an example of proprietary software which performs high-level compression of data transmitted over a multi-point LAN.

FIG. 2 is a diagram of the layers of software and hardware in a LAN with high-level data compression. Data file 30 may be a large file which is larger than the amount of data which can be transmitted in a single packet. Data file 30 is compressed using a data compression algorithm such as the Lempel-Zev (L-Z) algorithm. Compressed file 32 is then read by application layer 34, the top layer in the 7-layer Open Systems Interconnection (OSI) model describing network communication. Application layer 34 passes the data in compressed file 32 down to presentation layer 36, then to session layer 38, transport layer 40, network layer 42 and data link layer 44. Some layers add header information such as source and destination addresses of the transmitting and receiving LAN stations, and append frame error-check information. Physical layer 46 often includes the adapter card and the LAN cable 28 or other communications media, which carries compressed file 32, divided into packets with header and frame error-check information added.

LAN cable 28 transmits packets bit-by-bit in a serial fashion from physical layer 46 of the transmitter to physical layer 46' of the receiver. These bits are assembled into frames and passed up from physical layer 46' to data link layer 44', then assembled into packets for network layer 42'. Transport layer 40' then checks for errors and strips off headers and frame error-check information. Session layer 38' compressed file 32' which is sent to application layer 34' by presentation layer 36'. Since compressed file 32' is compressed, the user or a sophisticated high-level application must expand or de-compress compressed file 32' to recover data file 30'.

FIG. 3 shows a data packet transmitted and received at the data link layer. Transmitted packet 48 starts with a header including destination address 54 identifying the receiving LAN station, source address 52 which identifies the transmitting LAN station, and type/length field 56 which identifies the type and length of transmitted packet 48. Data field 50 contains a certain number of bits determined by the length in type/length field 56. Frame checksum 58 contains a checksum for data field 50, destination address 54, source address 52, and type/length field 56. Frame checksum 58 is used to determine if an error has occurred during transmission. Since data 50 may have already been compressed by high-level compression before being packetized, received packet 48' is identical to transmitted packet 48.

High-level compression of data file 30 of FIG. 2 reduces the number of packets and bits that are transmitted over LAN cable 28, but the user or sophisticated high-level application software must explicitly compress the data before transmission. However, this high-level compression is either not transparent to the user, or requires specialized compression software which may not be compatible with other existing application software.

Since LANs typically connect to both newer and older systems which may not have software or hardware to compress data, a LAN station cannot compress all data transmitted since the receiving station may not be able to de-compress the data. While data compression has been widely used for point-to-point communications such as WANs, multi-point networks have not used compression because all LAN stations might not have compression hardware or software. Integrating compression into an existing network standard such as IEEE 802.x is difficult since backward compatibility must be maintained. However, the existing IEEE standard does not have any provision for compression.

What is desired is data compression for multi-point networks such as LANs. It is desired to use compression on a network having arbitrary LAN stations with various capabilities. It is further desired to transparently compress the transmitted data without requiring the user to explicitly execute compression software before transmission, and without requiring specialized application software to compress data. It is desired to compress the data on a low-level but be compatible with older LAN equipment.

SUMMARY OF THE INVENTION

A local-area-network LAN station communicates a compressed data packet to a destination LAN station on a multi-point network. The LAN station has a physical layer making a physical connection to a medium connected to other LAN stations. The physical layer drives the compressed data packet from the LAN station onto the medium in a serial fashion.

A data link layer receives from a higher layer a data frame and a source network address of the LAN station and a destination network address of the destination LAN station. The data link layer assembles the compressed data packet and transfers the compressed data packet to the physical layer for transmission. The data link layer includes a compression means for compressing a data frame received from the higher layer into a compressed data frame. A checksum means generates a checksum for the compressed data frame while a packet assembly means receives the compressed data frame and the checksum. It appends the compressed data frame and checksum to the source network address and the destination network address to generate the compressed data packet. Thus low-level compression occurs in the data link layer.

In further aspects of the invention the higher layer adds a high-level protocol header to application data to form the data frame. Thus the data frame includes application data and the high-level protocol header. The high-level protocol header includes a high-layer address of the destination LAN station. This high-layer address is represented by a different binary number than the destination network address. Thus the high-layer address is contained in the data frame which is compressed. The high-layer address is an Internet-Protocol (IP) address, an IPX header address, an X.25 packet layer address, a DECnet™) network layer address, an AppleTalk™ network address, IBM's SNA basic transmission unit address, or other standard or proprietary network protocol addresses.

In still further aspects of the invention the data link layer further has a destination compression capability means which receives the destination network address. It determines when the destination LAN station is capable of de-compressing the compressed data frame. A compression disable means is coupled to the compression means. It disables the compression means when the destination compression capability means determines that the destination LAN station is not capable of de-compressing the compressed data frame. The compression means outputs the data frame as the compressed data frame when disabled. Thus compression is disabled for destination LAN stations that do not have de-compression capability but compression is enabled for destination LAN stations that can de-compress the compressed data frame.

In other aspects of the invention the destination compression capability means is an address table of destination network addresses capable of de-compression, or the destination network address is compared to a block of network addresses assigned to a LAN manufacturer that manufactures LAN stations with low-level de-compression capability.

In still further aspects the data link layer further includes a logical link control means receiving the data frame from the higher layer. A media access control means receives the compressed data packet from the packet assembly means. It transfers the compressed data packet to the physical layer. The packet assembly means and the checksum means are part of the media access control means. Thus the compression means receives the data frame from the logical link control means and outputs the compressed data frame to the media access control means. The compression means lies between the logical link control means and the media access control means in the data link layer.

DETAILED DESCRIPTION

The present invention relates to an improvement in local-area networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

LOW-LEVEL COMPRESSION IN DATA LINK LAYER

Figure 1:
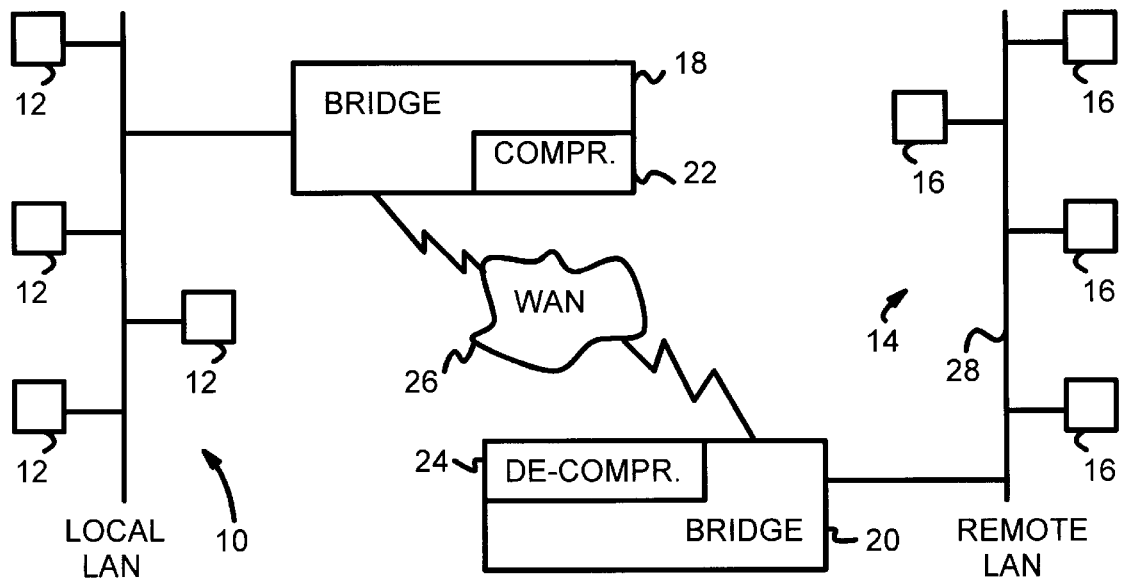
FIG. 1 is a prior-art WAN network connecting two LAN networks.
Figure 2:
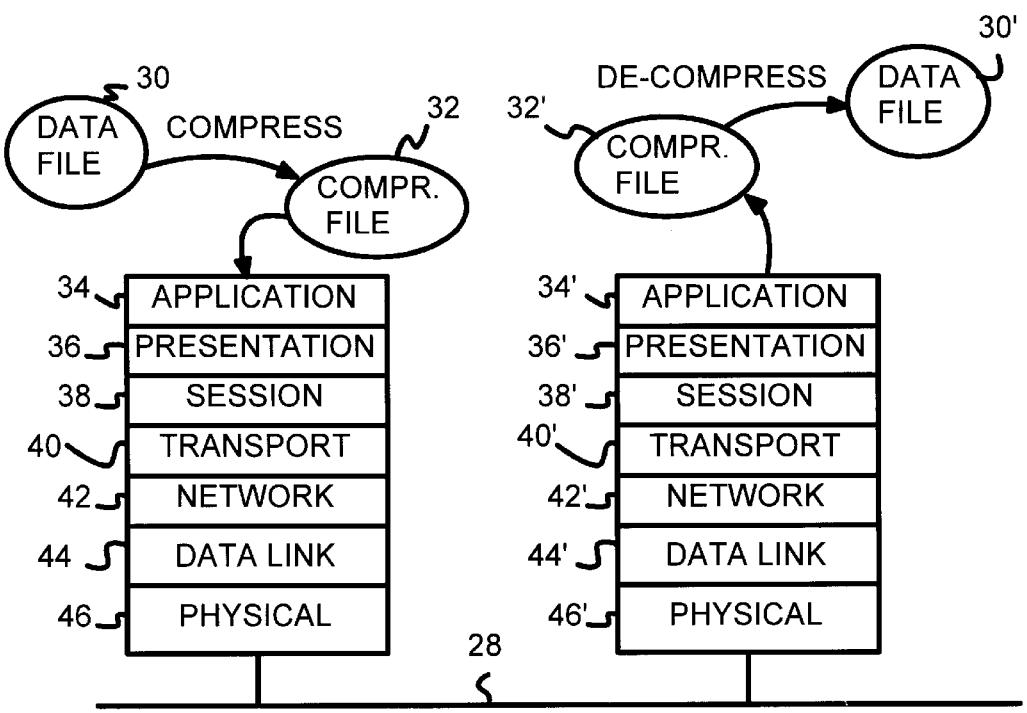
FIG. 2 is a diagram of the layers of software and hardware in a LAN with high-level data compression.
Figure 3:
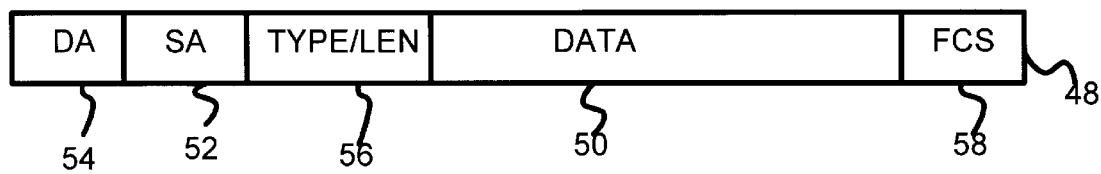
FIG. 3 shows a data packet transmitted and received at the data link layer.
Figure 3:
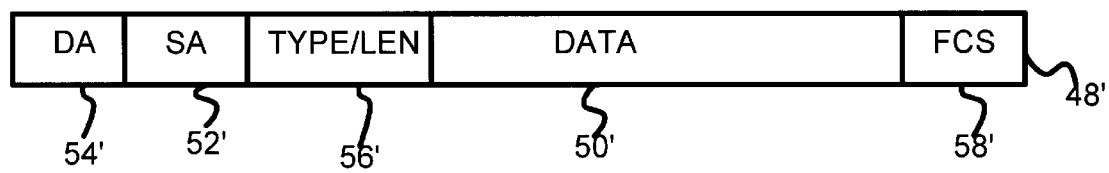
Figure 4:
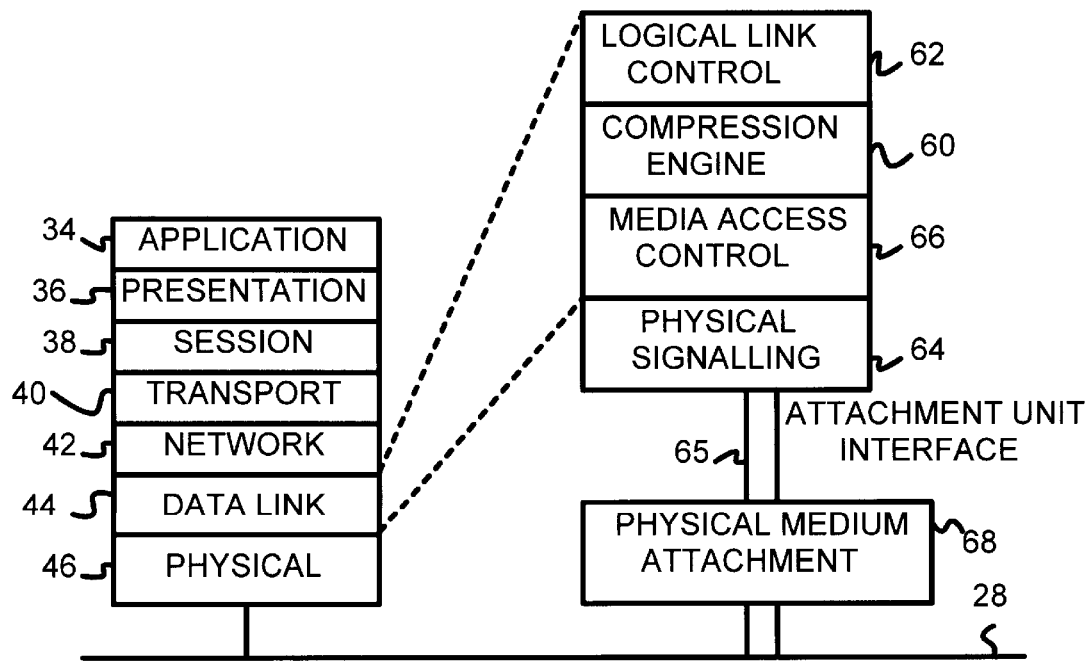
FIG. 4 is a protocol layer diagram of a LAN network having low-level compression.

FIG. 4 is a protocol layer diagram of a LAN network having low-level compression. The OSI 7-layer model includes the high-level application layer 34, presentation layer 36, session layer 38, transport layer 40, network layer 42, data link layer 44, and physical layer 46. Physical layer 46 transmits raw bits over a communication channel such as a LAN cable. Data Link Layer 44 handles transmission errors and controls the transmission facility so that network layer 42 does not have to know transmission details. Network layer 42 controls the operation of the subnet. Transport layer 40 accepts data from session layer 38 and splits this data into smaller units before being passed down to network layer 42. On the receiving side, transport layer 40 checks that all smaller units of the data are received. Thus transport layer 40 adds information to the data packet indicating the number of smaller units the data is split into. Session layer 38 provides a user interface to the network, while presentation layer 36 performs functions as a general solution requested by many users.

The data from the application layer is appended with header information from other layers. For example, in the TCP/IP model, the Internet Protocol (IP) address is appended by the IP layer, which roughly corresponds to the network or transport layers in the 7-layer model. The network or transport layer may append the Internet protocol (IP) address of the source and destinations to the data, while the lower data link layer appends the network source and destination addresses (SA, DA) to the data and the IP addresses. Higher layers may also append length and protocol type information specific to that layer to the data field, while lower layers generate another type/length field for a data field which now includes the protocol type information appended by the higher layers. Thus by the time the data field reaches the lower layers much high-level header information has been added to the actual data from the application itself. High-level compression of the actual data from the application would not compress the additional header information added to the data by intermediate protocol layers. However, low-level compression is able to compress all this header information from the intermediate layers. Thus low-level compression is able to compress a larger portion of the packet than high-level compression, since the intermediate layer's header are also compressed.

The low-level data link layer 44 is the layer immediately above the physical layer and assembles the serial bit stream from physical layer 46 into frames which are then assembled into packets before being sent up to network layer 42. Data link layer 44 generates and compares the frame checksum to ensure integrity of the transmitted packet.

Physical layer 46 is composed of several components. The actual media connecting the LAN stations is LAN cable 28, which is preferably a twisted-pair of wires, although shielded cable such as coax is often used, as is fiber optic cable. LAN cable 28 is capable of serial transmission of bits of data using an encoding scheme such as Manchester encoding or MLT3 encoding to encode the clock with the data stream. LAN cable 28 is physically attached to a connector on a LAN adapter card (also known as a medium attachment unit, MAU) in the LAN station, which extracts the clock from the data stream in physical medium attachment (PMA) 68. The serial bit stream is passed up to physical signaling component 64 through attachment unit interface 65, which buffers the data stream and assembles the raw bits into parallel data such as bytes. The LAN station's processor may read bytes of data from the buffer in physical signaling component 64, which may be part of the LAN adapter card.

The layer immediately above physical layer 46 is data link layer 44. Data link layer 44 is preferably implemented as a combination of software, hardware and firmware possibly on the LAN adapter card, while all the layers above data link layer 44 are implemented in software. Data link layer 44 is composed of media access control 66, and logical link control 62, with compression/de-compression engine 60 inserted between. Media access control 66 transfers a packet to the buffer in physical signaling component 64 by splitting the packet into bytes. Media access control 66 provides collision sensing and handling for Ethernet, or token passing for token ring networks. Logical link control 62 receives packets including header, data, but the frame checksum is typically stripped off by media access control 66 before reaching logical link control 62. For simpler implementations, media access control 66 is implemented as the hardware and firmware on the network adapter card while logical link control 62 is implemented as software executing on the main processor of the host PC. More complex networks may implement media access control 66 in software. Logical Link control 62 transfers data to media access control 66 by issuing AT or PCI bus writes to transfer the data from software to the hardware. Compression engine 60 may be implemented in either hardware or software since it is located at the hardware/software boundary in a typical PC implementation. For reception, compression engine 60 receives or intercepts these packets from media access control 66 which generates a checksum to compare to the received frame checksum. An error is signaled if the generated and received checksums do not match. Compression engine 60 then de-compresses the data field, and adjusts the type/length field for the compressed data before sending the compressed frame up to logical link control 62. Any transmission errors are detected by media access control 66.

For transmission, compression engine 60 receives or intercepts the packets from logical link control 62 and compresses the data field, and adjusts the type/length field for the compressed data before sending the compressed frame to media access control 66.

FORMAT OF COMPRESSED AND UN-COMPRESSED LOW-LEVEL PACKETS

Figure 5A:
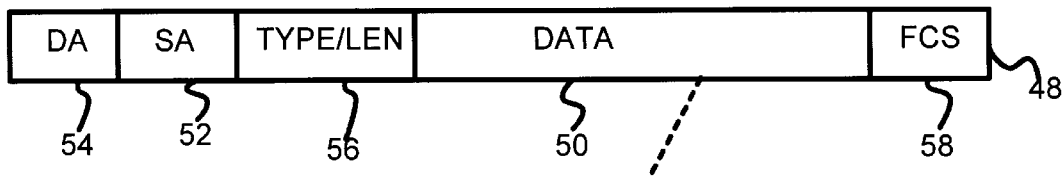
FIG. 5A illustrates the format of transmission packets from the logical link control which are compressed before being sent to the media access control in the data link layer.
Figure 5A:
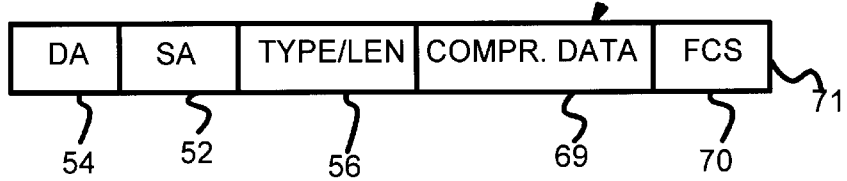

FIG. 5A illustrates the format of transmission packets from the logical link control which are compressed before being sent to the media access control in the data link layer. Transmission packet 48 from logical link control 62 of FIG. 4 is a standard data packet which starts with a header including destination address 54 identifying the receiving LAN station, source address 52 identifying the transmitting LAN station, and type/length field 56 which identifies the type and length of transmitted packet 48. Data field 50 contains a certain number of bits of uncompressed data determined by the length in type/length field 56. Frame checksum 58 contains a checksum for data field 50, destination address 54, source address 52, and type/length field 56, which is used to determine if an error has occurred during transmission.

Transmission packet 48 is received by compression engine 60 and the data bits in data field 50 are compressed using a compression algorithm such as the Lempel-Zev (L-Z) algorithm and variants or huffman encoding. The new length of the compressed data field 69 is determined, and type/length field 56 is adjusted for the new compressed length. The length of the packet may be any value up to 1500 bytes for Ethernet, or 5000 bytes for token ring. When the length of the data field is so small that the packet is less that the smallest packet size allowed (64 bytes for Ethernet), pad bits are added to the end of compressed data field 69 to reach the smallest allowed length. Pad bits are identified by the length of the data in the data frame. The pattern of the pad bits is ignored so any pattern may be used for the pad bits. The length field is adjusted for the data length without the pad bits so that the starting location of the pad bits can be determined.

Since the compressed data in compressed data field 69 differs from the original data in data field 50, the original frame checksum 58, if present, is no longer valid. A new checksum is generated for all the bits, including pad bits, in compressed data field 69. The new frame checksum 70 is appended to the end of compressed data field 69 to form the compressed packet 71.

Received Packets De-Compressed in Data Link Layer

Figure 5B:
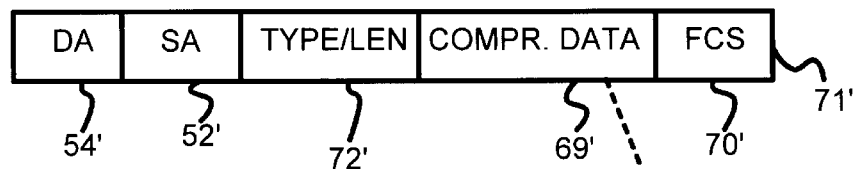
FIG. 5B illustrates the format of reception packets from the media access control which are de-compressed before being sent up to the logical link control in the data link layer.
Figure 5B:
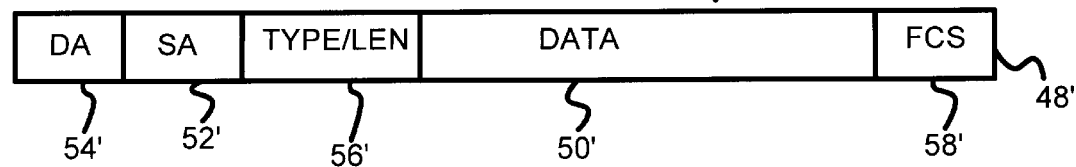

FIG. 5B illustrates the format of reception packets from the media access control which are de-compressed before being sent up to the logical link control in the data link layer.

A compressed packet 71' is received by compression engine 60 from media access control 66. The data bits in data field 50 were compressed by the transmitting LAN station as described for FIG. 5A. When no errors occur, the transmitted compressed packet 71 of FIG. 5A is identical to compressed packet 71' that is received.

A compression algorithm such as the L-Z is used to de-compress compressed data field 69' into un-compressed data field 50' and any pad bits are removed and discarded. When pad bits are used, the length field has a value less than 50 and is used to indicate the exact length of the compressed data and determine where the pad bits are. The new length of the de-compressed data field 50' is determined, and type/length field 72' is adjusted for the un-compressed length and written as type/length field 56'.

Since the compressed data in compressed data field 69' differs from the de-compressed data in data field 50', the transmitted frame checksum 70' is no longer valid for the de-compressed data in data field 50'. Frame checksum 70' is checked against the compressed data in the media access control component just before de-compression. Once this check is done the checksum is no longer needed and may be discarded.

However, if the checksum is checked in a higher layer, a new, un-compressed frame checksum 58' must be generated for all the bits in un-compressed data field 50'. The un-compressed frame checksum 58' is appended to the end of compressed data field 69 to form the un-compressed packet 48'. The destination address 54' and the source address 52' from compressed packet 71' are passed up to the logical link control in packet 48'.

Status Byte for Enabling Compression and Flushing History Buffer

Figures 6, 7:
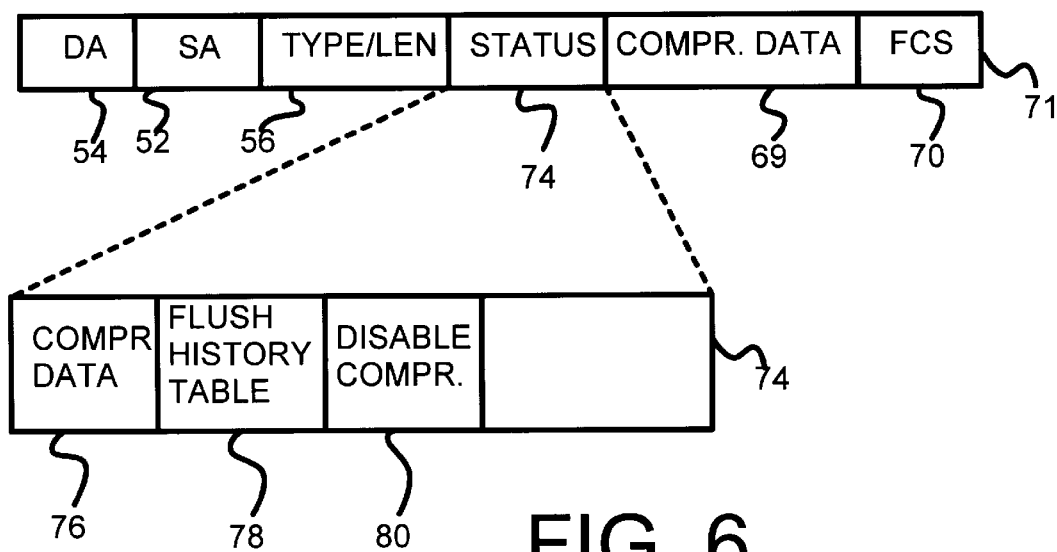
FIG. 6 highlights a status byte in the packet header for enabling and disabling compression.
FIG. 7 is a table of destination addresses and their compression capabilities.

FIG. 6 highlights a status field or status byte in the packet header for enabling and disabling compression. Compressed packet 71 can optionally include status field or status byte 74. Status byte 74 includes bits to enable and control compression. Compressed data bit 76 is set when compressed data field 69 has compressed data, but cleared when no compression is used in the current packet. History buffer flush bit 78 is set when the transmitting LAN station requests that the receiving LAN station clear or flush its history buffer. The history buffer contains a mapping of original, uncompressed data characters or sequences to compressed data characters or sequences. The history buffer is also known as the look-up or translation table for compression, or simply the compression table. Since both the transmitter and receiver must have coordinated copies of this history buffer, history buffer flush bit 78 allows for coordination of these buffers in separate LAN stations.

Disable compression bit 80 is set when the transmitting LAN station sends a request to the receiving LAN station to disable or enable compression mode. The transmitting LAN station will set bit 80 to disable compression for a period of time, such as when data files have already been compressed by high-level compression software. The receiving LAN station send back a packet to the transmitting station with bit 80 set to acknowledge that compression mode has been disabled. When compression mode is disabled, compressed data bit 76 is ignored and no data compression occurs.

Address Table Includes Compression Capabilities of Each Station

FIG. 7 is a table of destination addresses and their compression capabilities. A similar table is used for source addresses for de-compression of received packets (not shown). For each recently-accessed LAN station on the local network, or remote LAN station accessed through a bridge or WAN, an entry exists in address table 82. An alias, or shortened form of the destination address may be stored with the destination address. Either these aliases or the full destination addresses may be associatively searched for an entry that matches the destination address in the current packet to be transmitted. When a destination-address match is found, the compression enable field is consulted to determine if the receiver is capable of decompressing a low-level compressed data field. If not, compression may not be used for that receiver. The status byte may be used to set and clear this compression enable field when a request to enable or disable compression is received. Address table 82 is accessed by compression engine 60 on transmission to determine if compression should be enabled for the destination LAN station. Some LAN stations may support compression while other LAN stations may not support compression. Thus older LAN stations without compression capability may be freely combined with new LAN stations that do support compression.

OPERATION OF LOW-LEVEL COMPRESSION

Figure 8A:
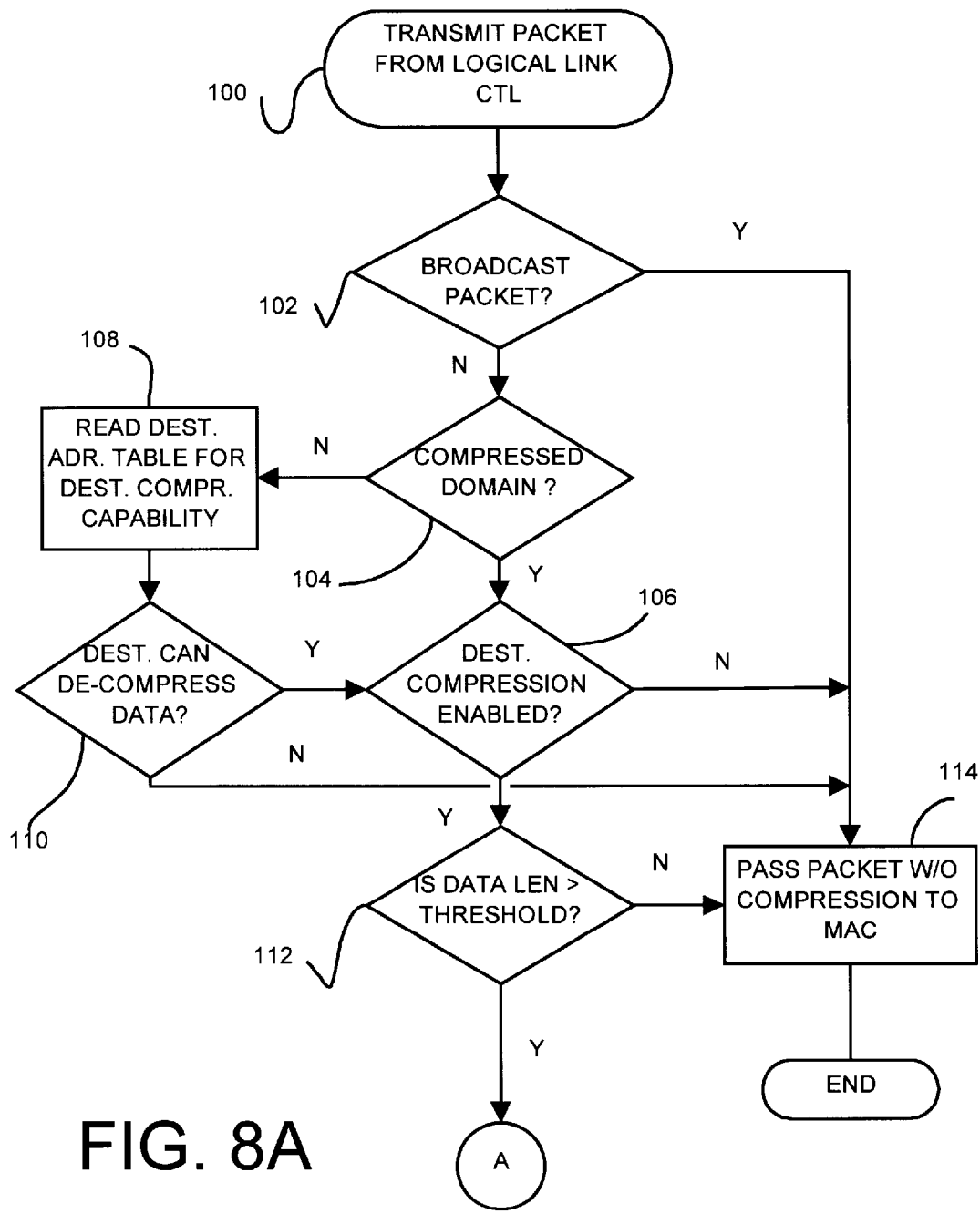
FIGS. 8A, 8B are a flowchart of the transmission process used by the low-level compressor in the data link layer.
Figure 8B:
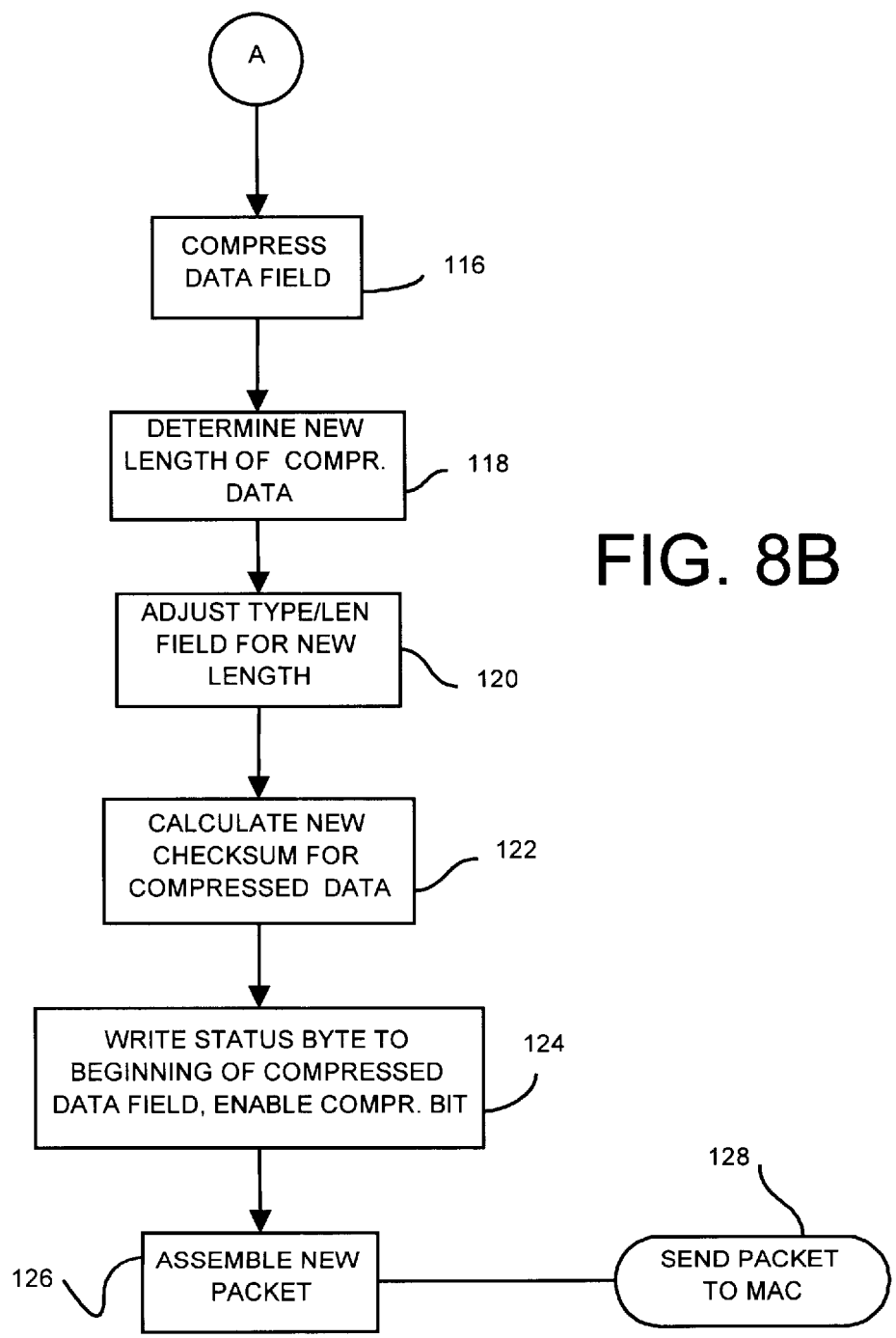

FIGS. 8A, 8B are a flowchart of the transmission process used by the low-level compressor in the data link layer. The transmit packet is sent down to the compression engine from the logical link control in the data link layer, step 100. Compression is not used if the packet is to be a broadcast packet, which is sent to all LAN stations on the network. Broadcast packets have an address of all one bits (a 16-bit address has the value FFFF hex), which is not used by any LAN station. If the transmit packet is not a broadcast packet, step 102, then it is determined in step 104 if the LAN is a compressed domain where all LAN stations have compression capabilities. Step 104 may simply read a compressed domain bit in a configuration register or buffer. For compressed domains, steps 108, 110 are skipped. When some of the LAN stations have compression capabilities but others do not, the destination address table 82 of FIG. 7 is consulted to determine if the destination has compression capabilities, step 108. When the destination does not have compression, the uncompressed data packet received from the logic link control is simply passed on to the lower media access control (MAC) component of the data link layer, step 114. When the destination can de-compress the data, the destination address table is checked (step 106) to determine if the compression is enabled or disabled. Compression can be disabled for a destination that has compression capabilities by setting the disable compression bit of the status byte as explained for FIG. 6.

Finally, the length of the data field is compared to a threshold length for compression. Small packets do not benefit from compression as much as larger packets, as the history table may not have enough data to efficiently compress data. Some packets may already have the smallest data length allowed, and thus compressing the data further does not reduce the packet size. The threshold length may be set to the length of the data field for the smallest packet size allowed or used by the network. When the length of the data is less than the threshold length, step 112, then no compression is performed and the original packet passed on, step 114.

Compression is thus skipped when either:
1. The transmit packet is a broadcast packet (step 102).
2. The destination does not have de-compression capability (step 110).
3. The destination's de-compression is disabled (step 106).
4. The data length is less than the threshold length (step 112).
5. The compression is not efficient and actually increases the data length (not shown).

When the transmit packet is to be compressed, FIG. 8B, the data field is first compressed, step 116. This data field can include header information from higher layers such as the transport layer. The length of the compressed data is determined, step 118, and pad bits are added if necessary to reach the smallest allowed data length. The type/length field is then adjusted to indicate that the packet now has the new compressed data length, step 120. The checksum of the compressed data is calculated, step 122, and the new frame checksum (FCS) replaces the old checksum (if present) for the uncompressed data. The checksum method is determined by the LAN protocol used, such as IEEE 802.2 or 802.3. A cyclical-redundancy scheme such as CRC 32 may be used.

The status byte is generated, step 124, with the data compression bit set to indicate that the data field is compressed. The disable compression bit may be set when it is desired to disable compression on the receiving LAN station.

The new packet is assembled, step 126, as the original source and destination addresses, the type/length field adjusted for the compressed data length, the compressed data, and the new frame checksum for the compressed data. The status byte is placed at the beginning of the compressed data and included when generating the checksum. The new transmit packet is then sent down to the media access control component, step 128 as the compression engine component completes.

Figure 9A:
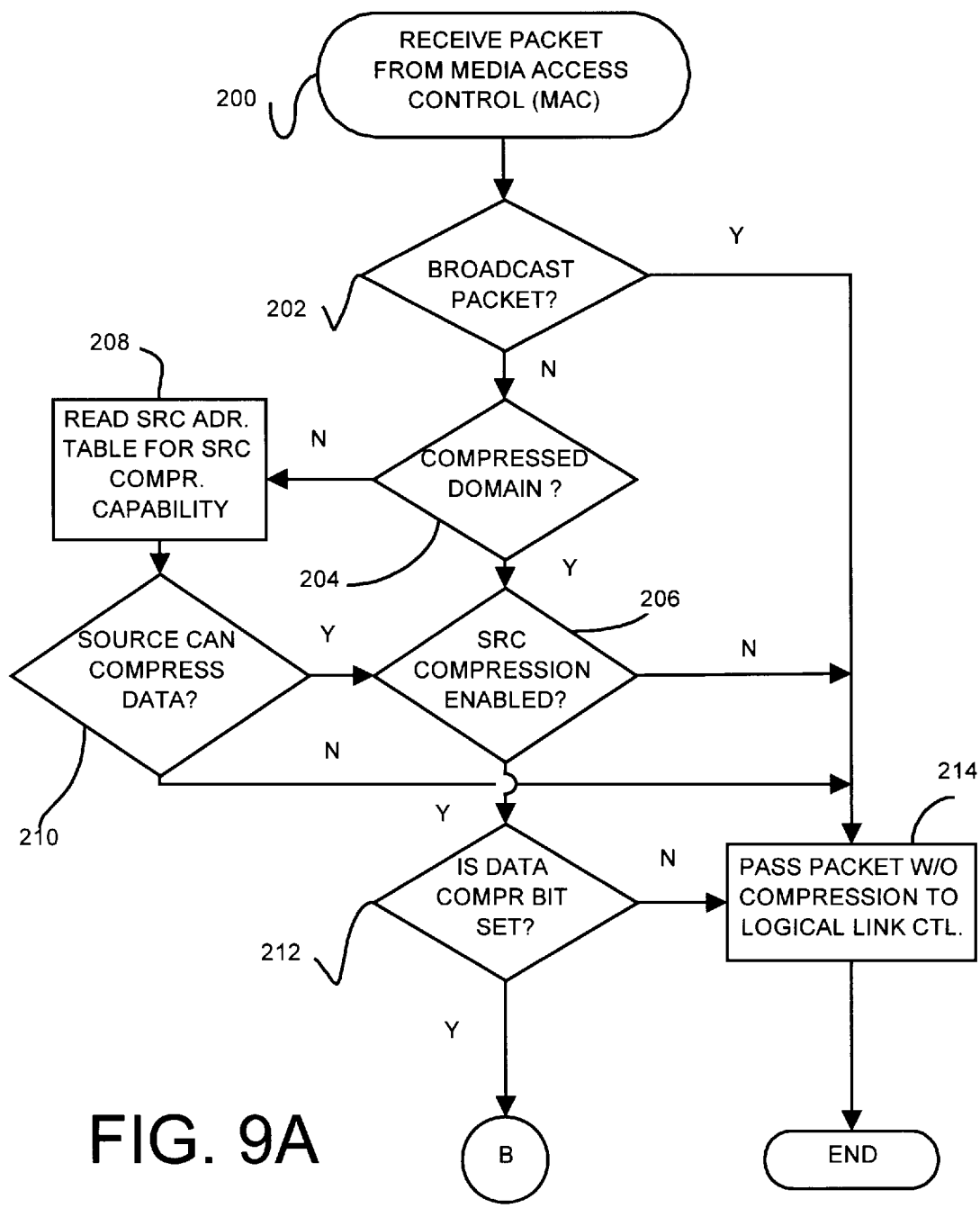
FIGS. 9A, 9B are a flowchart of the reception process used by the low-level compressor in the data link layer.
Figure 9B:
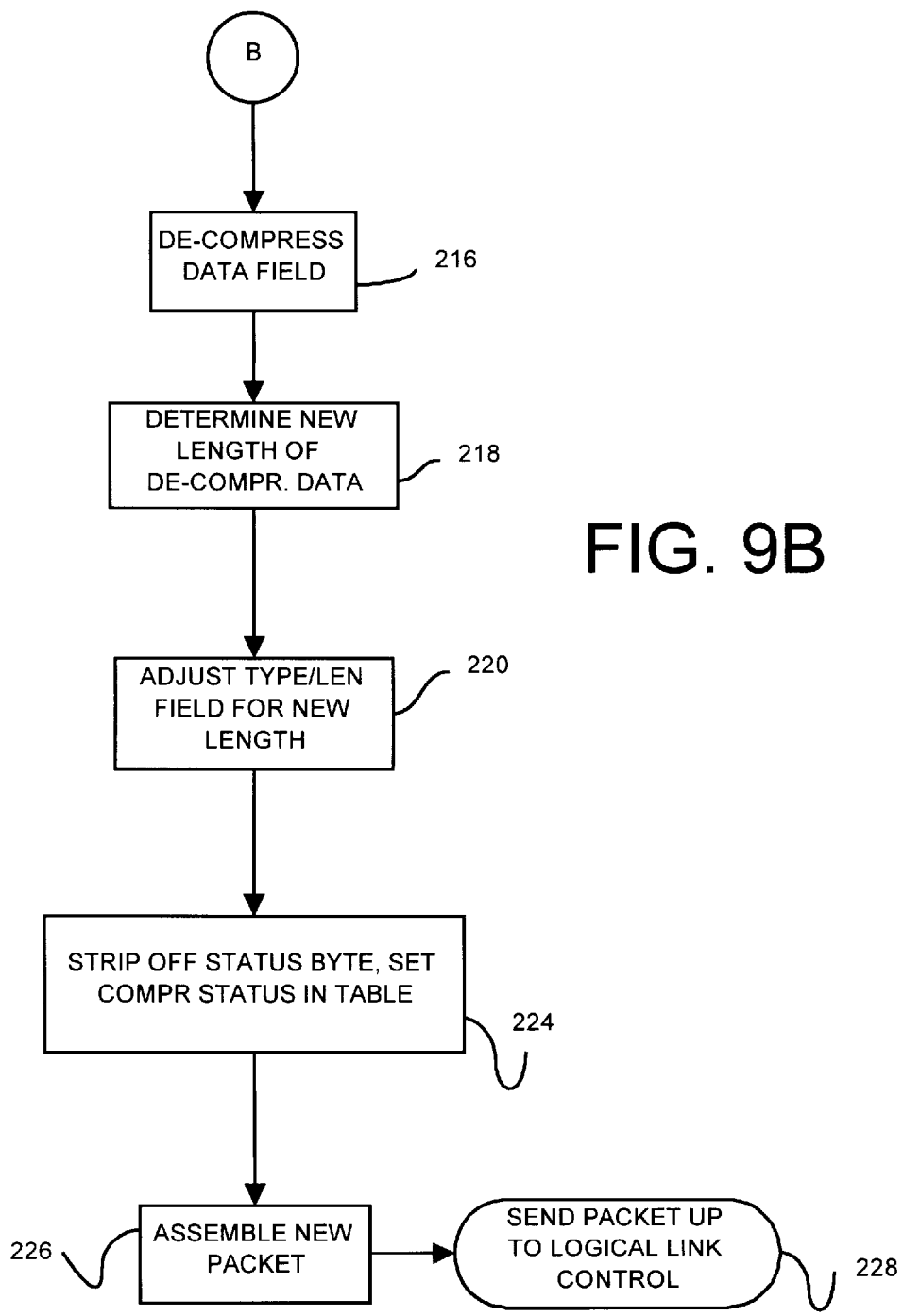

FIGS. 9A, 9B are a flowchart of the reception process used by the low-level compressor in the data link layer. The packet received from the physical layer is sent from the media access control (MAC) component of the medial link layer to the compression engine in the data link layer, step 200. The compression engine determines if the packet received is a broadcast packet, step 202. Since broadcast packets are not compressed, de-compression is skipped and the packet is passed up to the logical link control component of the data link layer, step 214. If the domain is compressed, step 204, then the source address table need not be consulted and steps 208, 210 can be skipped. For most LANs that do not have all LAN stations with compression, a source address table similar to the destination address table described for FIG. 6 is read, step 208. The source table indicates for source addresses, rather than for destination addresses, if compression is enabled and if the source has compression capability. When the source cannot compress data, step 210, then the packet cannot contain low-level compressed data and the original packet is passed up to the next higher component, step 214. Otherwise, the source table is consulted to determine if the source has its compression enabled, step 206. When the source's compression is not enabled, the original packet is also passed up to the logical link control, step 214.

The data compressed bit of the status byte is then checked, step 212. The transmitting LAN station may have not used compression for this packet, especially when the packet is so small that compression is not useful. The data compressed bit of the status byte is set by the transmitter when the packet is not compressed. The receiver reads the status byte to determine if the packet is compressed.

Once it is determined that the data in the packet received must have been compressed, FIG. 9B, the compression engine de-compresses the data in the data field after separating out the status byte and any pad bits, step 216. The length of the un-compressed data is then measured, step 218, and the type/length byte is adjusted for this un-compressed length, step 220. The status byte is discarded and the compression status in the source address table is updated if necessary, step 224. Once compression is disabled by the status byte, it can only be re-enabled by re-booting the host PC.

The new packet with the uncompressed data is assembled, step 226 and sent up to the logical link control component, step 228.

LOW-LEVEL COMPRESSION COMPATIBLE WITH HUBS & BRIDGES

An advantage of the low-level compression in the data link layer is that it is compatible with more complex networks such as when the local LAN node is connected to other LAN nodes using hubs, or when the local LAN is connected to a WAN using a bridge.

Figure 10:
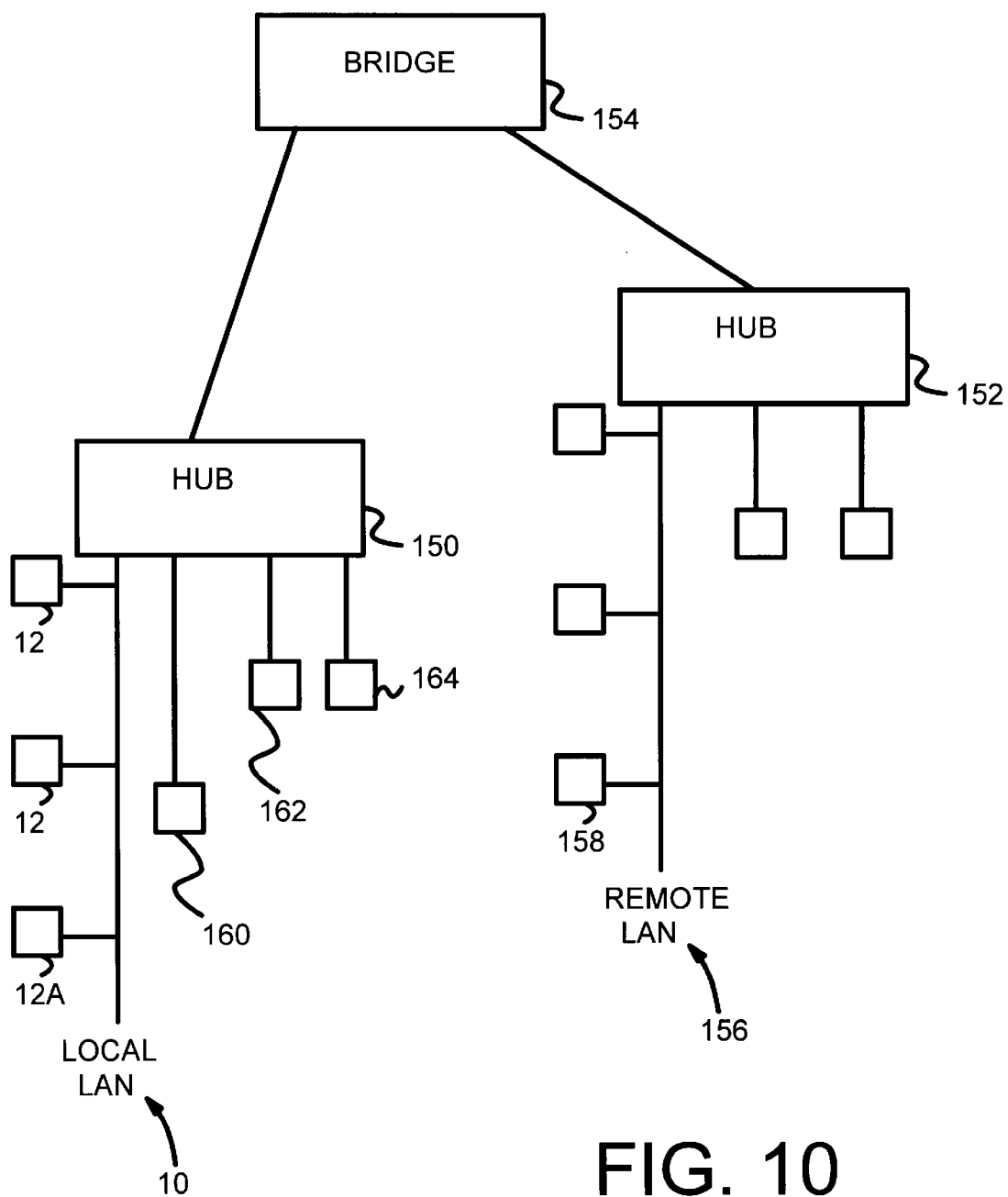
FIG. 10 illustrates a LAN connected to other LANs through hubs.

FIG. 10 illustrates a LAN node connected to other LAN nodes through hubs. Local LAN 10 includes LAN stations 12 connected together by a LAN cable. LAN stations 12 include some LAN stations with compression capability and other LAN stations without compression capability. LAN 10 is connected to local hub 150 which appears as another LAN station on LAN 10. However, local hub 150 is also connected to other nodes of the local LAN such as LAN nodes 160, 162, 164, each of which have LAN stations physically connected by a LAN cable. Local hub 150 connects LAN 10 to LAN nodes 160, 162, 164 by repeating packets from LAN 10 to other LAN nodes.

Other LAN nodes are also formed into a metropolitan area network by hub 152 and bridge 154. The term "metropolitan area network" highlights a level of networks just beyond the local area network. Hubs 150, 152, and bridge 154 are connected together by passing packets across wide-area links, perhaps phone lines or simply longer cables. Hubs 150, 152, and bridge 154 are connected together in a point-to-point arrangement rather than a multi-point arrangement. Traditional bridges may also be connected to hubs 150, 152, and bridge 154 to form WANs.

LAN station 12A may send a compressed packet to remote LAN station 158 if both stations 12A, 158 have low-level compression capabilities and each station's compression capability has been registered in the other's address table. LAN station 12A transmits the compressed data packet over local LAN 10 with the destination address of the remote LAN station 158. Hub 150 is connected to LAN 10 and receives this packet when it detects that the destination address is not on LAN 10. Hub 150 or a router (not shown) determines that the destination address is not on any other LAN nodes 160, 162, 164 on hub 150, and sends the packet up to bridge 154. Hub 152 or another router (not shown) reads its address table and finds that the destination is on hub 152, and sends the packet to hub 152. Hub 152 routes the packet to LAN 156, where the packet is read by remote LAN station 158. Throughout the transmission through the three hubs 150, 152, and bridge 154, the data was compressed. Remote LAN station 158 de-compresses the data in the low-level compression engine in it data link layer.

None of the hubs 150, 152, and bridge 154 needed any compression capability, although the hubs' routers could have compressed and de-compressed the packet for inter-hub transfer. Since the data was already compressed, it is unlikely that inter-hub compression reduced the packet size by any appreciable amount. The compressed packet could also be transmitted over a WAN using bridges and modems without the bridges on the WAN being aware that the data was originally compressed. Thus the low-level compression is transparent to hubs and WANs.

Figure 11:
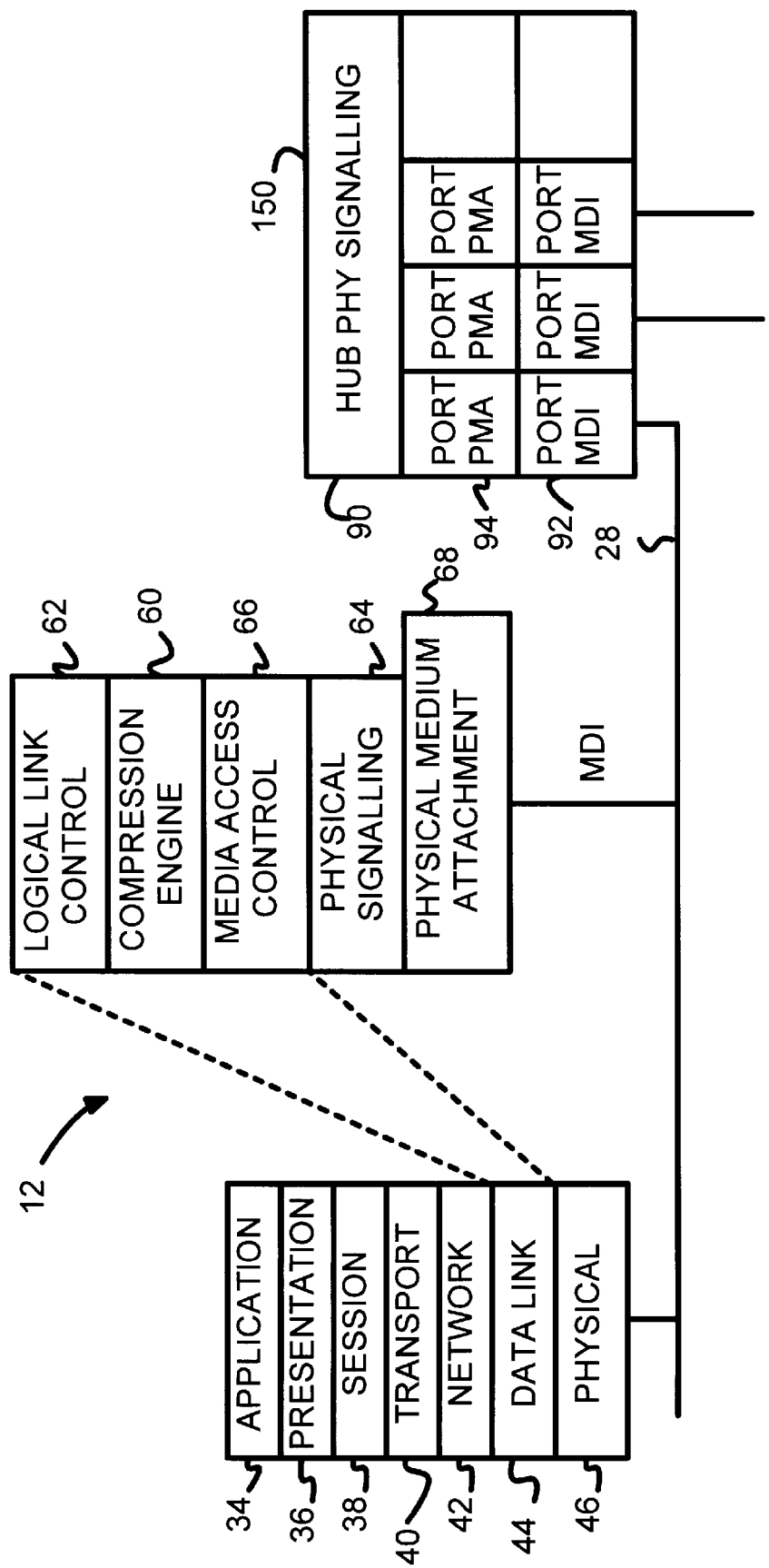
FIG. 11 is a layer diagram of a LAN station with low-level compression connected to a hub without compression.

FIG. 11 is a layer diagram of a LAN station with low-level compression connected to a hub without compression. The 7-layer OSI model for LAN station 12 includes physical layer 46, data link layer 44, network layer 42, transport layer 40, and other higher layers which are not shown. Data link layer 44 includes logical link control 62, compression engine 60, and media access control 66. Physical layer 46 includes physical signaling component 64, physical medium attachment 68, and a medium-dependent interface to LAN cable 28. LAN cable 28 is connected to other LAN stations (not shown) and to hub 150. Hub 150 has a physical layer with medium-dependent interface 92, physical medium attachment 94, and hub physical signaling component 90. Hub physical signaling component 90 is common for all ports on hub 150 so that packets may be routed to other LANs attached to the other ports on hub 150.

Higher layers are not present on hub 150 since connection to bridge 154 is through a port that appears like a port to another LAN. Higher layers could exist on bridges and routers to transmit packets to other bridges. However, because these higher layers are used to route packets, these higher layers are not the same as the higher layers on LAN station 12, but may differ for different WANs.

Since only the physical layer is present on hub 150, while the compression engine lies in the next higher layer, data link layer 44, the compression is compatible with and transparent to hub 150. Duplex LAN cables may also be used with a star-topography hub which acts as a repeater, duplicating signals from one LAN station to other LAN stations. Thus although each LAN station has a separate physical LAN cable, because the hub repeats all data to other LAN stations, all LANs on the hub belong to the same 'collision domain' and thus share the same media.

ADVANTAGES OF THE INVENTION

The compression engine performs the steps of FIGS. 8A, 8B on transmission, and the steps of FIGS. 9A, 9B on reception. These steps fit nicely into the existing LAN protocols as the frame checksum and type/length fields are adjusted for the compressed data. Thus the low-level compression is transparent to higher and lower protocol layers as the checksums and length fields are adjusted and accurate. In many implementations, the checksum is generated in the media access control component just below the compression engine. Thus the compression engine does not have to re-generate the checksum since the checksum is generated and removed at the lower media access control level. Having the compression just above the media access control level is beneficial since the checksum may not exist at higher levels.

Since lower levels do not read the data itself, it does not matter if the data is compressed or not as the lower layers can not determine what the data itself is but merely pass the data on.

Application layer data is appended with header information from intermediate layers. For example, the IP layer, corresponding to the network or transport layer may append the Internet protocol (IP) address of the source and destinations to the data, while the lower logical link control component in the data link layer appends the network source and destination addresses (SA, DA) to the data and the IP addresses. Higher layers may also append length and protocol type information specific to that layer to the data field, while lower layers generate another type/length field for a data field which now includes the protocol type information appended by the higher layers. Thus by the time the data field reaches the lower layers much high-level header information has been added to the actual data from the application itself. High-level compression of the actual data from the application would not compress the additional header information added to the data by intermediate protocol layers. However, low-level compression is able to compress all this header information from the intermediate layers. Thus low-level compression is able to compress a larger portion of the packet than high-level compression, since the intermediate layer's header are also compressed.

Figure 12:
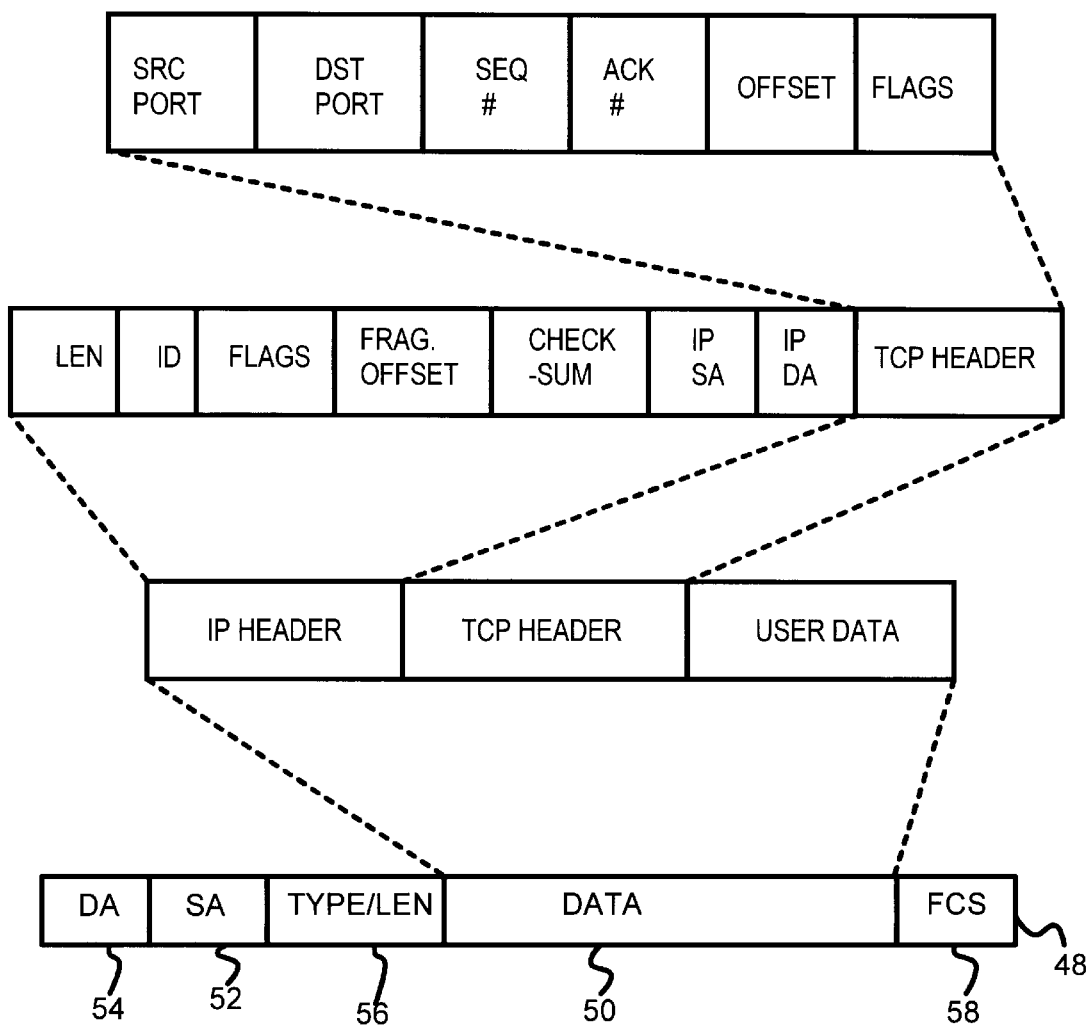
FIG. 12 illustrates how the low-level data which is compressed may itself contain higher-layer protocol information.

FIG. 12 illustrates how the low-level data which is compressed may itself contain higher-layer protocol information. Transmitted packet 48 has a low-level header including destination address 54 identifying the receiving LAN station, source address 52 identifying the transmitting LAN station, and type/length field 56 identifying the type and length of transmitted packet 48. Data field 50 contains a certain number of bits determined by the length in type/length field 56. Frame checksum 58 contains a low-level checksum for data field 50 which is used to determine if an error has occurred during transmission.

Data field 50 itself is composed of user data as well as an IP header and a TCP header. The IP header includes length, identification, and flags for the higher-level IP protocol. A fragment offset may identify the current packet as one packet in a larger data set which had to be split into smaller packets. The IP checksum is a high-level checksum for the IP layer's header and data. A source address and a destination address for the IP layer (IP-SA and IP-DA) are IP addresses which have different binary values that the low-level address network addresses DA 54, SA 52.

The TCP header also contains another high-level source address known as the source port, and a high-level destination address known as the destination port. These addresses also differ in value from the IP addresses and the low-level network address, even though all addresses may refer to the same LAN station. A sequence number identifies the current packet in a larger sequence of data being transmitted, while an acknowledge number is used for communicating among high-level TCP layers. Offset and flags may also be used.

Compression of the packetized data allows smaller packets to be transmitted. Smaller packets require less time for transmission, and are thus less likely to incur a transmission error. Thus more reliable transmission occurs with the invention. Smaller packets are also easier to manage and arrange than are larger packets. Smaller packets reduce the amount of time the network is used and free bandwidth. Thus not only is available bandwidth increased by compression the data in the packets, but the delay or latency for another LAN station to acquire the network is reduced.

ALTERNATE EMBODIMENTS

Several other embodiments are contemplated by the inventor. For example higher layers may use other formats such as TCP/IP, AppleTalk™, DECnet™, IBM's SNA, an X.25, Novell's Netware™, or other standard or proprietary network protocols. The higher layers add their header information to the data field that is passed down to the data link layer. Thus the TCP/IP or other headers appear as the data itself to the lower layers. This is another advantage since the higher-level header information is compressed along with the actual data. The header information may include the Internet protocol (IP) addresses of both the source and destination, a higher-layer's checksum, additional data length or high-level protocol type information, and communication relevant to the higher network layer between the higher layers of the transmitter and receiver, such as the number of packets that the user's data is split into.

The high-level address such as the IP address for TCP/IP systems is placed into the data frame by a higher layer and is compressed along with the actual data from the user. Other protocols use other high-level addresses besides IP addresses. For example, the IP address is replaced with a network layer address for DECnet™ portocols, or an IPX header address for Novell™ Netware systems. The IP address may also be replaced with SNA's basic transmission unit (BSU) address, an X.25 packet layer address, an AppleTalk™ network address, or other standard or proprietary network protocol addresses.

The low-level compression has been described as sandwiched in the data link layer, but it may also appear in other low-levels. Compression can be implemented just above the logical link control, or below the media access control or even in the physical layer. Many of the protocol layers may be implemented in either software or hardware, or a combination of both, and even the physical layer may contain some software or firmware although hardware is required to connect to the LAN cable. The compression engine in particular has been described as being implemented in software, but all or part of it could be implemented in hardware. Hardware compression integrated circuits are commercially available and can be used to speed up the compression and de-compression and thus are desirable for higher speed LANs. Performing the compression in a lower layer near the physical layer is advantageous when hardware compression is used, since much of the physical layer is already implemented in hardware.

While the preferred embodiment has used a multi-point Ethernet LAN, other multi-point LANs such as token-ring or asynchronous transfer mode (ATM) may also use the invention. For token ring, each LAN station is physically connected to just two stations —an upstream and a downstream station. Data packets travel around the ring in one direction. These data packets may be compressed, since any stations that are not the receiver simply pass the data packet undisturbed to the next station in the ring. Thus the token ring network may also be considered a multi-point network. Ethernet LANs using a star arrangement with a repeater hub are also considered to be multi-point networks since several transmitters and receivers exist on the same collision domain. Point-to-point networks have only one transmitter and one receiver, although the transmitter and receiver may change roles for duplex communication.

Many different compression algorithms may be used to compress the data, as long as the compression scheme is lossless. Manipulation of the compression history or look-up table may also improve compression performance. The status byte may be deleted or inserted at the end of the data frame before the checksum. All packets sent to receivers with compression capabilities are compressed when no status byte is used. The destination address table is still consulted to determine if the intended receiver can decompress the packet. Another alternative is to remove the address tables. Each manufacturer of LAN adapters is assigned a block of network addresses by the network standards committee. The destination address itself can be used to determine if the receiver can de-compress the data, while the source address can be used to determine if the packet is compressed. When the address is from a manufacturer that supports compression, then it is assumed that the packet is compressed. Each manufacturer can designate a portion of their addresses as being compression-capable LAN stations while other addressed from that manufacturer are designated non-compression LAN stations. Thus the network address itself may be used to identify LAN stations that support compression.

The LAN station described herein may be a user's personal computer (PC) with a LAN adapter card. Alternately, the LAN adapter may be included directly on the motherboard itself. The LAN station may also be considered to be part of a hub, switch, router, or server.

The type/length field may also be included in the data frame which is compressed in an alternate embodiment. The type/length field is not altered, but compressed, much as a higher-layer protocol address is compressed with the data frame. The new length of the compressed data frame can be passed to the physical layer directly. The end of the data frame can be determined by the receiving station as simply when the carrier is dropped. The checksum ensures that all data is received, even without a new length field being transmitted.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A local-area-network LAN station for communicating a compressed data packet to a destination LAN station on a multi-point network, the LAN station comprising:
   a physical layer for making a physical connection to a medium connected to other LAN stations, the physical layer driving the compressed data packet from the LAN station onto the medium in a serial fashion;
   a data link layer, receiving from a higher layer a data frame and a source network address of the LAN station and a destination network address of the destination LAN station, for assembling the compressed data packet and transferring the compressed data packet to the physical layer for transmission, the data link layer including:
      compression means for compressing a data frame received from the higher layer into a compressed data frame;
      checksum means for generating a checksum for the compressed data frame;
      packet assembly means, receiving the compressed data frame and the checksum, for appending to the source network address and the destination network address the compressed data frame and checksum to generate the compressed data packet;
      destination compression capability means, receiving the destination network address, for determining when the destination LAN station is capable of de-compressing the compressed data frame;
      wherein the destination compression capability means comprises comparing the destination network address to a block of network addresses assigned to a LAN manufacturer that manufactures LAN stations with low-level de-compression capability;
      compression disable means, coupled to the compression means, for disabling the compression means when the destination compression capability means determines that the destination LAN station is not capable of de-compressing the compressed data frame, the compression means outputting the data frame as an un-compressed data frame when disabled;
      logical link control means for receiving the data frame from the higher layer; and
      media access control means, receiving the compressed data packet from the packet assembly means, for transferring the compressed data packet to the physical layer, the packet assembly means and the checksum means being part of the media access control means;
      wherein the compression means receives the data frame from the logical link control means and outputs the compressed data frame to the media access control means,
   whereby low-level compression occurs in the data link layer by the compression means between the logical link control means and the media access control means in the data link layer and whereby compression is disabled for destination LAN stations that do not have de-compression capability but compression is enabled for destination LAN stations that can de-compress the compressed data frame.

2. The local-area-network LAN station of claim 1 wherein the higher layer adds a high-level protocol header to application data to form the data frame, whereby the data frame includes application data and the high-level protocol header.

3. The local-area-network LAN station of claim 2 wherein the high-level protocol header includes a high-layer address of the destination LAN station, the high-layer address represented by a different binary number than the destination network address, whereby the high-layer address is contained in the data frame which is compressed.

4. The local-area-network LAN station of claim 3 wherein the high-layer address is selected from the group consisting of an Internet-Protocol (IP) address, an IPX header address, an X.25 packet layer address, a DECnet™ network layer address, an AppleTalk™ network address, and an SNA basic transmission unit address.

5. The local-area-network LAN station of claim 1 wherein the destination compression capability means further comprises an address table of destination network addresses capable of de-compression.

6. The local-area-network LAN station of claim 1 wherein the destination LAN station has a physical layer making a physical connection to the medium, whereby the destination LAN station is on a same LAN node as the LAN station.

7. The local-area-network LAN station of claim 1 wherein the destination LAN station has a physical layer making a physical connection to a different medium, whereby the destination LAN station is on a remote LAN node from the LAN station.

8. The local-area-network LAN station of claim 7 wherein the medium of the LAN station and the remote LAN node of the destination LAN station are connected by a connector selected from the group consisting of a bridge, a switch, and a router, the connector making a point-to-point connection between the medium of the LAN station and the remote LAN node of the destination LAN station,
   whereby the connector forms a wide-area network (WAN).

9. The local-area-network LAN station of claim 8 wherein the connector compresses the compressed data packet from the LAN station to form a WAN packet for transmission across the WAN, the connector de-compressing the WAN packet to recover the compressed data packet,
   whereby the compressed data packet from the LAN station is compressed again by the connector for transmission across the WAN.

10. The local-area network LAN station of claim 1 wherein the LAN station is connected to other LAN stations on the multi-point network by a plurality of physical connections through a repeater hub, the medium connected to other LAN stations comprising a plurality of cables connected by repeaters in the repeater hub, whereby the LAN stations are in a common collision domain.

11. A local-area network LAN comprising:
  a first plurality of stations connected to a medium, the first plurality of stations not having low-level compression capability;
  a second plurality of stations connected to the medium, the second plurality of stations having low-level compression capability;
  each station in the second plurality of stations comprising:
    first means for sending un-compressed data packets to stations in the first plurality of stations that do not have low-level compression capability;
    second means for sending compressed data packets to stations in the second plurality of stations that have low-level compression capability;
    low-level compression means, using a logical link layer to receive a data frame from a high-level communication protocol, for compressing the data frame and for producing a compressed data packet, the low-level compression means sending the compressed data packet to the medium through a media access layer;
    compression capability means for enabling the low-level compression means for transmissions to the second plurality of stations but for disabling the low-level compression means for transmissions to the second plurality of stations,
  whereby un-compressed data packets are sent to stations in the first plurality of stations but compressed data packets are sent to stations in the second plurality of stations from other stations in the second plurality of stations, whereby packet compression selectively occurs in a mixed-compression domain.

12. The local-area network LAN of claim 11 wherein the compression capability means comprises comparing a destination network address to a block of network addresses assigned to a LAN manufacturer that manufactures LAN stations with low-level de-compression capability.

13. The local-area-network LAN of claim 12 wherein the high-level protocol header includes a high-level address of a destination LAN station,
  whereby the high-level address is contained in the data frame which is compressed.

14. The local-area-network LAN station of claim 13 wherein the high-level address is selected from the group consisting of an Internet-Protocol (IP) address, an IPX header address, an X.25 packet layer address, a DECnet™ network layer address, an AppleTalk™ network address, and an SNA basic transmission unit address.

15. A data-compression LAN station for use on a mixed-domain LAN having stations with arbitrary compression capabilities, the data-compression LAN station comprising:
  upper-layer protocol means, receiving application data from an application layer above the upper layer protocol means, for generating a destination address and a data frame including the application data,
  first length-determining means, in the upper-layer protocol means, for determining a first length of the data frame and for outputting a length-specifying field;
  compression means, receiving the data frame and the length-specifying field from the upper-layer protocol means, for compressing the data frame to a compressed data frame;
  second length-determining means, receiving the compressed data frame from the compression means, for determining a second length of the compressed data frame;
  length adjust means, receiving the second length from the second length-determining means, for outputting an adjusted length-specifying field indicating a length of the compressed data frame;
  a checksum generator, receiving the compressed data frame from the compression means, for generating a checksum of the compressed data frame, the checksum being mathematically related to data in the compressed data frame, the checksum for verifying integrity of packet transmission over the mixed-domain LAN;
  compressed packet assembly means, receiving the compressed data frame, the checksum, the second length, and the destination address, for outputting a compressed packet including the destination address, the second length, the compressed data frame, and the checksum;
  physical transmission means, receiving the compressed packet from the compressed packet assembly means, for converting the compressed packet to a bit stream and outputting the bit stream to the mixed-domain LAN for reception by a station having the destination address;
  compression capability means, receiving the destination address, for determining when the destination station is capable of de-compressing the compressed data frame;
  wherein the compression capability means comprises comparing the destination address to network addresses assigned to stations with low-level compression capability;
  compression disable means, coupled to the compression means, for disabling the compression means when the compression capability means determines that the destination station is not capable of de-compressing the compressed data frame, the compression means outputting the compressed data frame with un-compressed data when disabled;
  a logical link controller for receiving the data frame from the upper-layer protocol means; and
  a media access controller, receiving the compressed packet from the compressed packet assembly means, for transferring the compressed packet to the physical transmission means, the compressed packet assembly means and the checksum generator being part of the media access controller;
  wherein the compression means receives the data frame from the logical link controller and outputs the compressed data frame to the media access controller,
  whereby data is compressed and a length field adjusted for a new length of the compressed data frame.

16. The data-compression LAN station of claim 15 wherein the mixed-domain LAN is an Ethernet LAN using the IEEE 802.3 standard, or a token-ring LAN or an ATM LAN.

17. The data-compression LAN station of claim 15 wherein the upper-layer protocol means includes means for adding an upper-level protocol header to the application data to generate the data frame,
  whereby the data frame includes the upper-level protocol header with the application data.

18. The data-compression LAN station of claim 17 further comprising:
  status field insertion means, coupled to the compressed packet assembly means, for inserting a status field indicating that compression is disabled, the compressed packet assembly means including the status field with the compressed packet, whereby the status field in the compressed packet indicates when data compression has been disabled.

19. A local-area-network LAN station for receiving a compressed data packet from a source LAN station on a multi-point network, the LAN station comprising:

a physical layer for making a physical connection to a medium connected to other LAN stations, the physical layer receiving the compressed data packet from the medium in a serial fashion;

a data link layer, sending to a higher layer a de-compressed data frame and a destination network address of the LAN station and a source network address of the source LAN station, for dis-assembling the compressed data packet received from the physical layer, the data link layer including:

packet dis-assembly means, receiving the compressed data packet, for generating from the compressed data packet the source network address and the destination network address and a compressed data frame and a transmitted checksum;

checksum means for generating a generated checksum for the compressed data frame and comparing the generated checksum to the transmitted checksum to determine if a transmission error has occurred;

de-compression means for de-compressing the compressed data frame received from the physical layer into the de-compressed data frame;

compression capability means, receiving the source network address, for determining when the source LAN station is capable of compressing the data frame;

wherein the compression capability means comprises comparing the source network address to a block of network addresses assigned to a LAN manufacturer that manufactures LAN stations with low-level de-compression capability;

compression disable means, coupled to the de-compression means, for disabling the de-compression means when the compression capability means determines that the source LAN station is not capable of compressing the data frame, the de-compression means outputting the data frame as an un-compressed data frame when disabled;

logical link control means for sending the de-compressed data frame to the higher layer; and media access control means, receiving the compressed data packet from the physical layer, for sending the compressed data packet to the packet dis-assembly means, the packet dis-assembly means and the checksum means being part of the media access control means;

wherein the de-compression means sends the de-compressed data frame to the logical link control means and receives the compressed data frame from the media access control means, whereby low-level de-compression occurs in the data link layer by the de-compression means between the logical link control means and the media access control means in the data link layer and whereby de-compression is disabled for source LAN stations that do not have compression capability but de-compression is enabled for source LAN stations that can compress the data frame.

* * * * *